United States Patent
Lei et al.

(10) Patent No.: US 10,355,986 B2
(45) Date of Patent: Jul. 16, 2019

(54) METHOD AND APPARATUS FOR FORWARDING AN INTEREST PACKET BASED ON A PROBABILITY TREE IN AN INFORMATION NETWORK

(71) Applicant: PEKING UNIVERSITY SHENZHEN GRADUATE SCHOOL, Shenzhen (CN)

(72) Inventors: Kai Lei, Shenzhen (CN); Lirui Gong, Shenzhen (CN); Jie Yuan, Shenzhen (CN); Lizhu Zhang, Shenzhen (CN)

(73) Assignee: PEKING UNIVERSITY SHENZHEN GRADUATE SCHOOL, Shenzhen, Guangdong (CN)

( * ) Notice: Subject to any disclaimer, the term of this patent is extended or adjusted under 35 U.S.C. 154(b) by 0 days.

(21) Appl. No.: 15/760,988

(22) PCT Filed: Aug. 18, 2016

(86) PCT No.: PCT/CN2016/095868
§ 371 (c)(1),
(2) Date: Mar. 16, 2018

(87) PCT Pub. No.: WO2018/032462
PCT Pub. Date: Feb. 22, 2018

(65) Prior Publication Data
US 2018/0309666 A1   Oct. 25, 2018

(51) Int. Cl.
*H04L 12/753* (2013.01)
*H04L 12/26* (2006.01)
*H04L 12/721* (2013.01)
*H04L 29/08* (2006.01)

(52) U.S. Cl.
CPC .......... *H04L 45/48* (2013.01); *H04L 43/0864* (2013.01); *H04L 43/12* (2013.01);
(Continued)

(58) Field of Classification Search
CPC ....................................................... H04L 45/48
See application file for complete search history.

(56) References Cited

U.S. PATENT DOCUMENTS

2010/0322220 A1* 12/2010 Brown ................ H04W 74/002
370/338
2013/0219081 A1   8/2013 Qian et al.
(Continued)

FOREIGN PATENT DOCUMENTS

CN    102638405 A    8/2012
CN    103841018 A    6/2014
(Continued)

OTHER PUBLICATIONS

International Search Report for PCT/CN2016/095868 dated Jun. 1, 2017 and its English translation provided by WIPO.
(Continued)

*Primary Examiner* — Ayanah S George
(74) *Attorney, Agent, or Firm* — Ladas & Parry, LLP

(57) ABSTRACT

A method and device for forwarding an interest packet based on a probability tree in an information network. By introducing a probability tree, the process of forwarding an interest packet is finally changed into a selection process: starting from a root node of the probability tree, selecting child nodes of a current node according to the probability of each child node of the current node, and stopping selecting until the selected child node is a leaf node. Moreover, the introduced probability tree provides a good carrier for machine learning. By considering the selection process as an optimization problem, the selection process can be converged to be approximate to an optimal state using online machine learning, and moreover, the probability of each node in the probability tree can be adjusted according to changes in network conditions, so that the forwarding method and device have strong adaptability to the network (Continued)

Y: relevant record is found       N: relevant record is not found changes, thereby improving self-adaptability. Compared with the existing interest packet forwarding solution, the present invention improves the forwarding efficiency, increases throughput, and achieves load balance.

10 Claims, 7 Drawing Sheets

(52) U.S. Cl.
CPC .............. *H04L 45/12* (2013.01); *H04L 45/70* (2013.01); *H04L 67/327* (2013.01)

(56) References Cited

U.S. PATENT DOCUMENTS

| | | | |
|---|---|---|---|
| 2014/0269330 A1* | 9/2014 | Parameswaran | H04L 47/125 370/238 |
| 2015/0117253 A1* | 4/2015 | Scott | H04L 45/306 370/254 |
| 2015/0215206 A1 | 7/2015 | Solis et al. | |

FOREIGN PATENT DOCUMENTS

| | | |
|---|---|---|
| CN | 104301305 A | 1/2015 |
| CN | 104604205 A | 5/2015 |
| EP | 2869537 A1 | 5/2015 |
| EP | 2899921 A1 | 7/2015 |

OTHER PUBLICATIONS

Written Opinion of the International Search Authority PCT/CN2016/095868 dated Jun. 1, 2017 and its English translation provided by Google Translate.

\* cited by examiner

METHOD AND APPARATUS FOR FORWARDING AN INTEREST PACKET BASED ON A PROBABILITY TREE IN AN INFORMATION NETWORK

CROSS-REFERENCE TO RELATED APPLICATION

The present application is the U.S. national phase of PCT Application PCT/CN2016/095868 filed on Aug. 18, 2016, the disclosure of which is incorporated herein by reference in its entirety.

FIELD

The present disclosure relates to the technical field of network communication, and more particularly to a method and apparatus for forwarding an interest packet based on a probability tree in an information network.

BACKGROUND

ICN (Information-Center Network), as a new-model network architecture proposed in recent years with an attempt to replace the conventional TCP/IP protocol-based network architecture, has become a new hot issue in researches on next generation network architecture. The ICN adopts an information-centered communication mode instead of existing end-to-end communication modes. In this mode of the ICN, the importance of data location is diminished; the ICN focuses on data content per se rather than physical logic.

NDN (Named Data Networking) is one of important representatives of the ICN. The NDN includes two kinds of data structures: an interest packet and a data packet, wherein the interest packet is for a data requester to request data in the network, and the data packet refers to the data returned from a data owner upon receipt of the request, i.e., the data packet is a response to the interest packet. The NDN is a pull-based architecture, wherein a consumer requests data by sending an interest packet, while the corresponding data packet is returned along the original path. In this way, a good content distribution function is achieved through a built-in data caching function and a flexible forwarding policy layer.

During an entire communication process of the NDN, a router needs to maintain the following table structures to implement its functions: Content Store (CS), Pending Interest Table (PIT), and Forwarding Information Base (FIB). As shown in FIG. 1, upon receiving the interest packet, the router first checks the CS; if relevant content is found, the content will be directly returned; otherwise, the PIT will be checked; if a relevant record is matched in the PIT, an interface for the interest packet to access will be added to PIT entries; otherwise, a new entry is created and the interest packet is forwarded based on the FIB.

A forwarding policy is a decision basis in the forwarding process in the NDN. Unlike a conventional IP network in which a routing layer is responsible for various functions while forwarding policy that decides whether to forward the interest packet, when to forward, and where to forward, wherein the FIB is a main basis for the forwarding process. The FIB comprises a name prefix and an interface list, which may be expressed as <Prefix, $face_1$, $face_2$, ..., $face_n$>. The NDN forwarding process adopts a longest prefix matching, and one interest packet may be forwarded out from a plurality of interfaces.

In the prior art, BestRoute is a core forwarding policy in the NDN, where the policy classifies forwarding interfaces into three categories according to their capabilities of obtaining a data packet, which are represented by green, yellow and red, respectively. To forward an interest packet, the green forwarding interface ranking top is selected in priority, and the yellow forwarding interface is a secondary choice; the red forwarding interface represents that the forwarding interface is invalid and cannot be used for forwarding. As the network status changes, the statuses of forwarding interfaces will also be shifted from one another. For example, a forwarding interface in a green state will be shifted to a yellow state in the case of being idle for a long time. This policy has a good adaptability to network statuses, but the shifts among the forwarding interfaces in red, yellow, and green statuses are very inflexible, such that this policy lacks a certain sensitivity, which easily causes overuse of an optimum forwarding interface; consequently, load equilibrium cannot be well achieved.

SUMMARY

According to a first aspect of the present disclosure, a method of forwarding an interest packet based on a probability tree in an information network is provided, comprising:

setting a threshold function according to a type of a to-be-forwarded interest packet, the threshold function being arranged for deciding whether to trigger the probability tree where leaf nodes correspond one-to-one to all optional forwarding interfaces for the interest packet to learn;

after the threshold function triggers the probability tree to learn, computing a cost value of each of the optional forwarding interfaces for the interest packet, respectively;

adjusting the probability tree by incrementing probabilities of a leaf node and non-leaf nodes in the probability tree, where the leaf node corresponds to an optional forwarding interface that has a smallest cost value and the non-leaf nodes refer to those nodes that have to be traversed from a root node till the leaf node;

based on the adjusted probability tree, starting from the root node of the probability tree, selecting, in accordance with probabilities of respective sub-nodes of a current node, a sub-node of the current node, and stopping till the selected sub-node is a leaf node; and forwarding the to-be-forwarded interest packet from the optional forwarding interface corresponding to the selected leaf node.

According to a second aspect of the present disclosure, an apparatus for forwarding an interest packet based on a probability tree in an information network is provided, comprising:

a threshold function setting unit configured for setting a threshold function according to a type of a to-be-forwarded interest packet, the threshold function being arranged for deciding whether to trigger the probability tree where leaf nodes correspond one-to-one to all optional forwarding interfaces for the interest packet;

a cost value computing unit configured for: after the threshold function triggers the probability tree to learn, computing a cost value of each of the optional forwarding interfaces for the interest packet, respectively;

a probability adjusting unit configured for adjusting the probability tree by incrementing probabilities of a leaf node and non-leaf nodes in the probability tree, where the leaf node corresponds to an optional forwarding interface that has a smallest cost value and the non-leaf nodes refer to those nodes that have to be traversed from a root node till the leaf node;

a first selecting unit configured for: based on the adjusted probability tree, starting from the root node of the probability tree, selecting, in accordance with probabilities of respective sub-nodes of a current node, a sub-node of the current node, and stopping till the selected sub-node is a leaf node; and a forwarding unit configured for forwarding the to-be-forwarded interest packet from the optional forwarding interface corresponding to the selected leaf node.

According to the method and apparatus implemented above for forwarding an interest packet based on a probability tree in an information network, with introduction of the probability tree, the interest packet forwarding process is finally transformed into such a selection process: starting from the root node of the probability tree, selecting a sub-node of the current node in accordance with the probabilities of respective sub-nodes of the current node, and stopping till the selected sub-node is a leaf node; while the introduced probability tree in turn provides a good carrier for machine learning. By regarding the selecting process as an optimization issue, it may be converged to a near optimal state using online machine learning; besides, as the network condition changes, probabilities of the respective nodes in the probability tree may be adjusted. In this way, the forwarding method and apparatus of the present disclosure have a strong adaptability to network changes, i.e., the adaptivity is improved. Compared with the existing interest packet forwarding schemes, the present disclosure improves forwarding efficiency, increases throughput, and achieves load equilibrium.

DETAILED DESCRIPTION OF EMBODIMENTS

Hereinafter, the present disclosure will be illustrated in further detail through specific embodiments in conjunction with the drawings.

As mentioned in the Background, in the ICN (a typical example is NDN), upon receiving an interest packet, the CS is checked first; if relevant content is found, the content will be directly returned; otherwise, the PIT will be checked; if a relevant record is matched in the PIT, an interface for the interest packet to access will be added to PIT entries; otherwise, a new entry is created and the interest packet is forwarded based on the FIB. The present disclosure addresses such a scenario that the received interest packet fails to be matched in both of the CS and the PIT and it is needed to be forwarded according to a forwarding interface in the FIB, which will be illustrated specifically infra.

Figure 1:
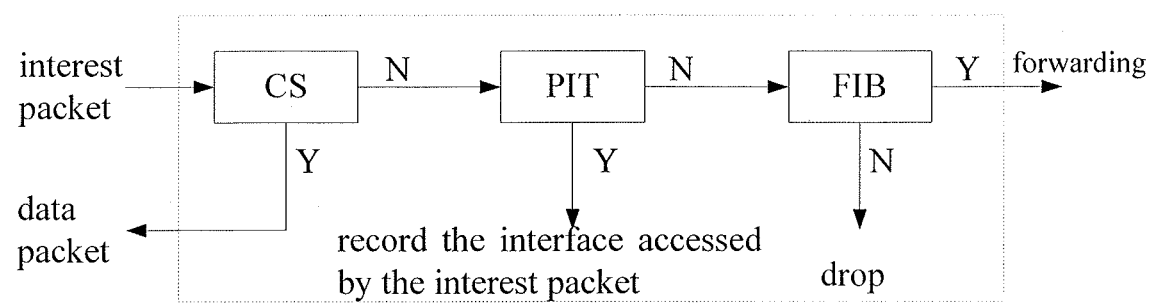
FIG. 1 shows a schematic diagram of a processing flow in an NDN upon receipt of an interest packet.
Figure 2:
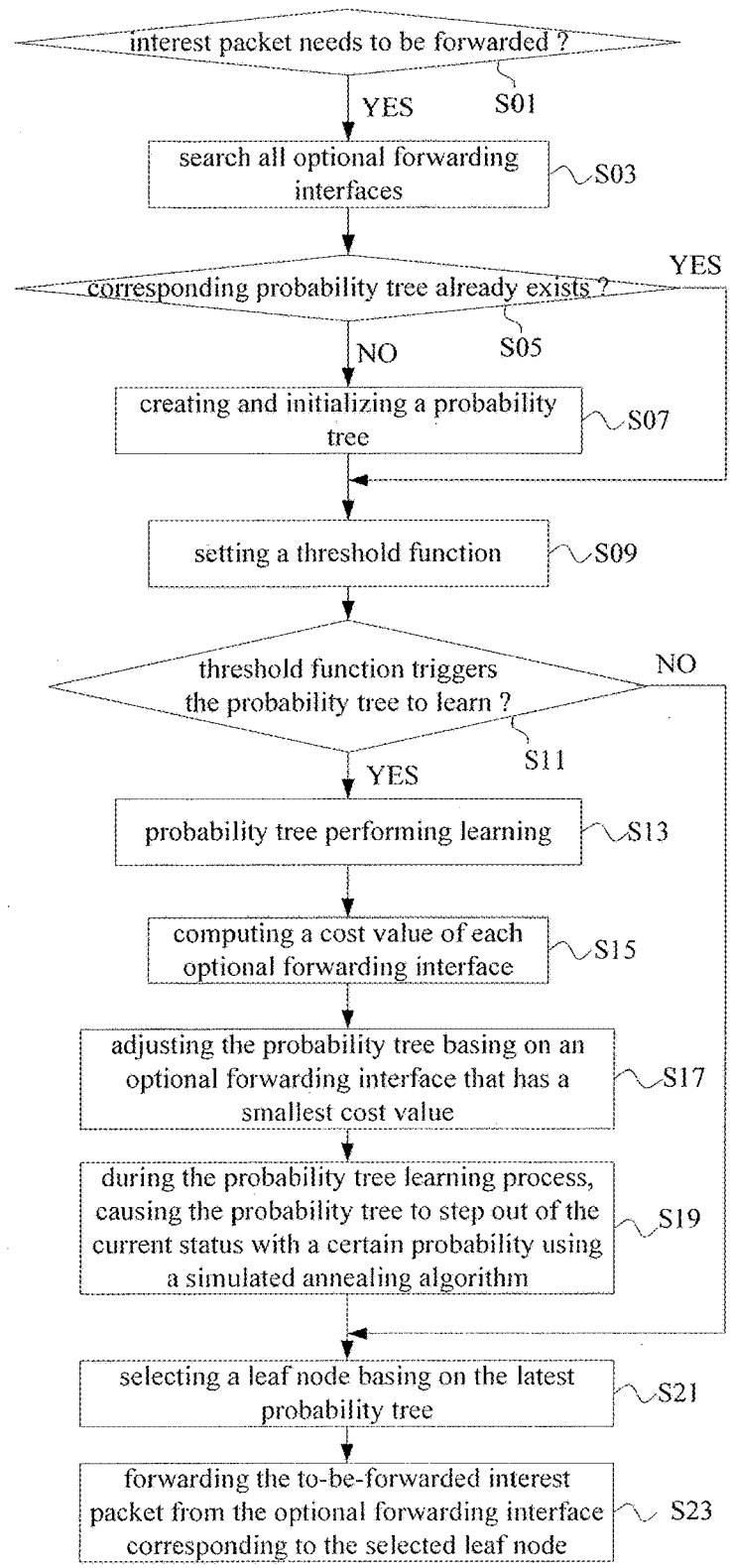
FIG. 2 shows a schematic flow diagram of a method of forwarding an interest packet based on a probability tree in an information network according to an embodiment of the present disclosure.

The present disclosure provides a method of forwarding an interest packet based on a probability tree in an information network (hereinafter referred to as an interest packet forwarding method). Please refer to FIG. 2, in an embodiment, the method comprises steps S01~S23.

Step S01: upon receiving an interest packet, determining whether the received interest packet needs to be forwarded. As mentioned above, if the received interest packet is successfully matched in the CS, the data packet as requested by the interest packet is directly returned; in the case of failing to be matched in the CS but successfully matched later in the PIT, the interface which the interest packet accesses will be added to PIT entries; if the received interest packet fails to be matched in the CS and the PIT, the interest packet needs to be forwarded.

Step S03: when determining that the received interest packet needs to be forwarded, searching all optional forwarding interfaces corresponding to the interest packet based on a forwarding information base (FIB).

Step 05: detecting whether a corresponding probability tree already exists in all optional forwarding interfaces corresponding to the received interest packet; if it is detected that such a corresponding probability tree does not exist, performing step S07; if it is detected that such a corresponding probability tree exists, performing step S09. Because the same type of data uses a same forwarding interface, it is possible that the currently received interest packet stores a corresponding probability tree.

Figure 3:
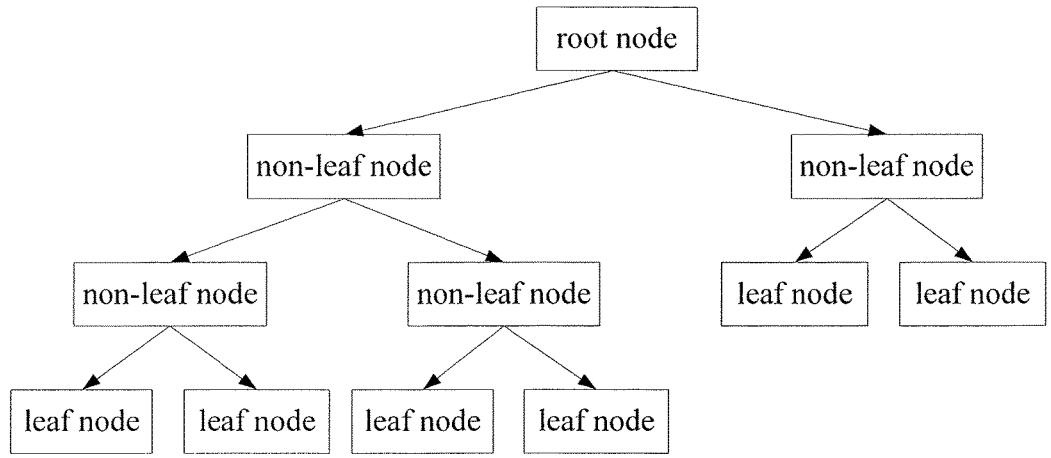
FIG. 3 shows a structural schematic diagram of a probability tree involved in the method of forwarding an interest packet based on a probability tree in an information network according to an embodiment of the present disclosure.

Step S07: creating a probability tree based on all optional forwarding interfaces corresponding to the received interest packet, and initializing the probability tree, wherein leaf nodes of the created probability tree correspond one-to-one to all optional forwarding interfaces corresponding to the interest packet. Those skilled in the art may understand that the probability tree mentioned in the present application is a data structure. Generally, as shown in FIG. 3, the probability tree includes a root node under which sub-nodes exist, where the sub-node at the lowest layer is referred to as a leaf node, while the remaining sub-nodes are referred to as non-leaf nodes. In an embodiment, to initialize the probability tree, probabilities of respective sub-nodes at the same layer may be made equal, wherein the probabilities of respective nodes refer to probabilities for a parent node of the respective sub-nodes to reach the respective sub-nodes. For example, in an embodiment, the probability tree may be initialized such that the probabilities of respective sub-nodes in FIG. 3 are all ½, i.e., for any sub-node, the probability for its parent node to reach the sub-node is all ½. It needs to be noted that the probabilities shown in FIG. 3 are only an example of the probability tree, where the number of nodes shown in the figure is not for limiting that the probability tree of the present disclosure can only have 10 sub-nodes; in addition, what is shown in FIG. 3 is a binary probability tree; in actuality, the present disclosure does not limit the number of branches of the probability tree, which may be a binary probability tree, a trident probability tree, a quadrantal probability tree, etc. In an embodiment, the number of branches of the probability tree may be set according to actual needs. In a preferred embodiment, the probability tree in the present disclosure is a binary probability tree. Hereinafter, any description of the probability tree takes the binary probability tree as an example.

Step S09: setting a threshold function based on a type of the to-be-forwarded interest packet, the threshold function being for deciding whether to trigger the probability tree where leaf nodes correspond one-to-one to all optional forwarding interfaces for the interest packet to learn. In an embodiment, the set threshold function may adjust a frequency of occurrence of a probability tree learning process, thereby satisfying interest packets of different types.

Step S11: detecting whether the threshold function triggers the probability tree to learn; in the case of triggering, performing step S13; and in the case of not triggering, performing step S21.

Step S13: the probability tree performing learning.

Step S15: during the probability tree learning process, computing a cost value of each optional forwarding interface of the interest packet, respectively. In one embodiment, when computing the cost value of an optional forwarding interface, the cost value of the optional forwarding interface is computed based on a network attribute and a probability value of the optional forwarding interface. The network attribute includes, but not limited to, a round-trip time and an interface status (e.g., rate limitation, etc.) of the forwarding interface; during a specific implementation process, one or more specific network attributes may be selected according to actual needs. The network attributes may be dynamically updated in real time based on network statuses. The probability value of the optional forwarding interface refers to a probability of reaching a leaf node corresponding to the optional forwarding interface from the root node on the probability tree, e.g., in FIG. 3, if the probability values of respective sub-nodes are all ½, the probability values of the optional forwarding interfaces corresponding to the left four leaf nodes are all ⅛, while the probability values of the optional forwarding interfaces corresponding to the right two leaf nodes are all ¼.

Figure 4:
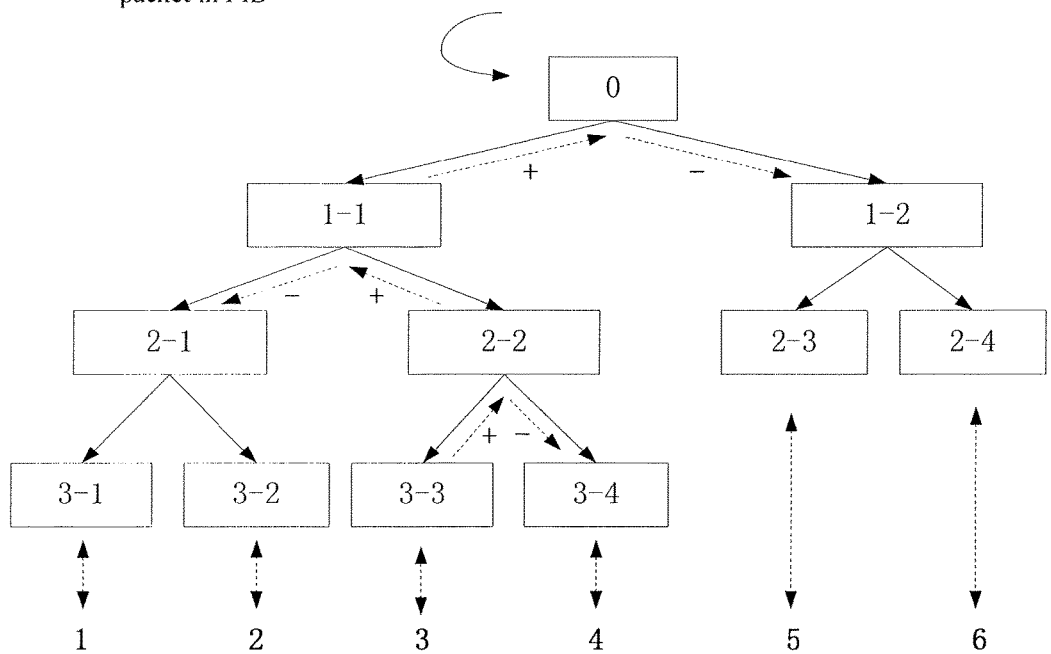
FIG. 4 shows a schematic diagram of adjusting the probabilities in the method of forwarding an interest packet based on a probability tree in an information network according to an embodiment of the present disclosure.

Step S17: adjusting the probability tree by incrementing probabilities of a leaf node and non-leaf nodes in the probability tree, where the leaf node corresponds to an optional forwarding interface that has a smallest cost value and the non-leaf nodes refer to those nodes that have to be traversed from a root node till the leaf node. As mentioned above, the probability of each sub-node refers to the probability for the parent node of the sub-node to reach the sub-node. For example, please refer to FIG. 4. Suppose the number of all optional forwarding interfaces corresponding to the to-be-forwarded interest packet in the FIB is 6, and the 6 optional forwarding interfaces form the probability tree in FIG. 4. Supposing the cost value of the third optional forwarding interface is the smallest, then the probability of its corresponding leaf node 3-3 is incremented, i.e., the probability from the non-leaf node 2-2 to reach the leaf node 3-3 is incremented. Meanwhile, the probability of non-leaf nodes which are traversed from the root node 0 to the leaf node 3-3 is incremented, i.e., the probabilities of the non-leaf nodes 2-2 and 1-1 in the figure are incremented. Increment of the probability of the non-leaf node 2-2 refers to increment of the probability from the non-leaf node 1-1 to reach the non-leaf node 2-2; and increment of the probability of the non-leaf node 1-1 refers to increment of the probability from the root node 0 to reach the non-leaf node 1-1. Because the total sum of the probabilities from any node to reach its respective sub-nodes is 1, when the probability of the leaf sub-node 3-3 increments, the probability of the leaf sub-node 3-4 correspondingly decreases; when the probability of the non-leaf sub-node 2-2 increments, the probability of the non-leaf sub-node 201 correspondingly decreases; and when the probability of the non-leaf sub-node 1-1 increments, the probability of the non-leaf sub-node 1-2 correspondingly decreases.

Step S19: during the probability tree learning process, causing the probability tree to step out of the current status with a certain probability using a simulated annealing algorithm. The step S19 is an optional step, aiming to prevent the probability tree from falling into a local optimum. Specifically, when the adopted simulated annealing algorithm causes the probability tree to step out of the current status, the current status of the probability tree is initialized; then, the probability tree may be subjected to subsequent steps, e.g., to determine whether to re-learn based on the threshold function, etc.

Step S21: based on the latest probability tree, starting from the root node of the probability tree, selecting, in accordance with probabilities of respective sub-nodes of a current node, a sub-node of the current node, and stopping till the selected sub-node is a leaf node. When it is detected in step S11 that the threshold function fails to trigger the probability tree to learn, the latest probability tree refers to the original probability tree, and correspondingly, the selecting in step S21 is made based on the original probability tree; when it is detected in step S11 that the threshold function triggers the probability tree to learn, the latest probability refers to the adjusted probability tree in step S17, and correspondingly, the selecting in step S21 is made based on the adjusted probability tree in step S17. This mode of selecting an optional forwarding interface based on the probability tree will cause that the optional forwarding interface having a larger probability value computed based on the probability tree will have a larger probability to be selected as the final actual forwarding interface; therefore, the probability values of respective optional forwarding interfaces may play a role of balancing network load. For example, please refer to FIG. 4, supposing that in the latest probability tree, the probability of the node 1-1 is ⅔, and the probability of node 1-2 is ⅓; the probability of the node 2-1 is ¼, and the probability of the node 2-2 is ¾; the probability of the node 2-3 is ½, and the probability of the node 2-4 is ½; the probability of the node 3-1 is ½, and the probability of the node 3-2 is ½; and the probability of the node 3-3 is ¾, and the probability of the node 3-4 is ¼; correspondingly, it may be computed that the probability value of the optional forwarding interface 1 is 1/12, the probability value of the optional forwarding interface 2 is 1/12, the probability value of the optional forwarding interface 3 is 3/8, the probability value of the optional forwarding interface 4 is 1/8, the probability value of the optional forwarding interface 5 is 1/6, and the probability value of the optional forwarding interface 6 is 1/6. According to step S21, starting from the root node (node 0 in the figure) of the probability tree, there is a ⅔ probability to select node 1-1, and a ⅓ probability to select node 1-2; if the node 1-1 is selected, then there is a ¼ probability to select node 2-1 and a ¾ probability to select node 2-2; if node 2-1 is selected, then there is a ½ probability to select node 3-1, and a ½ probability to select node 3-2; if the node 3-2 is selected, because at this point, the node 3-2 is a leaf sub-node, selection is stopped.

Step 23: forwarding the to-be-forwarded interest packet from the optional forwarding interface corresponding to the selected leaf node. According to the example posed in step S21, the leaf node 3-2 is finally selected in FIG. 4; therefore, the to-be-forwarded interest packet is forwarded from the optional forwarding interface 2 corresponding to the leaf node 3-2.

Hereinafter, the interest packet forwarding method of the present disclosure will be further illustrated through a practical example.

Upon receiving an interest packet, the network node first processes it in accordance with a standard NDN network working procedure. When matching fails in the CS and the PIT, the interest packet needs to be forwarded based on an FIB table. Respective optional forwarding interfaces ($face_1$, $face_2$, ..., $face_m$, where m is a positive integer) corresponding to the interest packet are obtained from the FIB table of the interest packet. It is checked whether a probability tree already exists for these optional forwarding interfaces; in the case of not, a probability tree is created based on these optional forwarding interfaces, such that the leaf nodes of the probability tree correspond one-to-one to these optional forwarding interfaces; because there are m optional forwarding interfaces, the probability tree also has m leaf nodes; the manner of creating the probability tree is similar to the process of creating a Huffman tree. Then, the probability tree is initialized. For example, as mentioned above, a binary tree is created, and here, its initialization may refer to initializing the probabilities for the parent node to reach the left sub-node and the right sub-node to be both ½.

Then, a threshold function μ is further introduced to adjust the occurrence frequency of the probability tree during the online learning process. In other words, a threshold function μ is introduced to decide whether to trigger the probability tree to learn, so as to change a learning intensity of the probability tree dependent on different network statuses and different application needs. For example, the network attribute RTT (Round-Trip Time) may be selected as the decision attribute. In this example, the following equation is employed to constitute the threshold function λ and determine the specific μ value:

$$\mu = \left(\left|\frac{RTT_0 + RTT_i}{RTT_0 + RTT_i}\right|\right)^\alpha$$

where $RTT_0$ represents the RTT of the previous time, $RTT_i$ represents the RTT of this time, and α denotes an adjustment parameter, which may be set according to needs.

when the probability tree is triggered to perform online learning, during the probability tree learning process, the cost values of the m optional forwarding interfaces $face_1$, $face_2$, ..., and $face_m$ are computed. Because the decision attribute in this example is RTT, the cost function may be defined as:

$$\mathbb{T}(\mathcal{D}(p_1, p_2, \ldots, p_n)) = \sum_{i=1}^{n} RTT * probability_i * k,$$

Then, the cost value of each optional forwarding interface is:

$$value_i = probability_i * RTT,$$

In the cost function and the cost value, RTT represents the round-trip time, probability represents a probability value of the forwarding interface, and k represents the number of packets.

Probabilities of the leaf node and the non-leaf nodes in the probability tree are incremented, where the leaf node corresponds to an optional forwarding interface that has a smallest cost value and the non-leaf nodes refer to those nodes that have to be traversed from a root node till the leaf node; due to inherent natures of the probability tree, in the case of incrementing the probability of any sub-node, the total probability of other sub-nodes that have the same parent node as that sub-node will be decreased.

A StepOut function may be set such that the probability tree will step out of the current status to re-learn, which may prevent falling into local optimum. For instance, a certain probability may be adopted in this example to cause the probability tree to randomly step out.

After the probability tree performs learning, based on the latest probability tree, starting from the root node of the probability tree, a sub-node of the current node is selected in accordance with the probabilities of respective sub-nodes of the current node, and the selection is stopped till the selected sub-node is the leaf node. Of course, as mentioned above, if the probability tree does not learn, the latest probability tree refers to the original probability tree.

Finally, the to-be-forwarded interest packet is forwarded from the optional forwarding interface corresponding to the selected leaf node.

Figure 5:
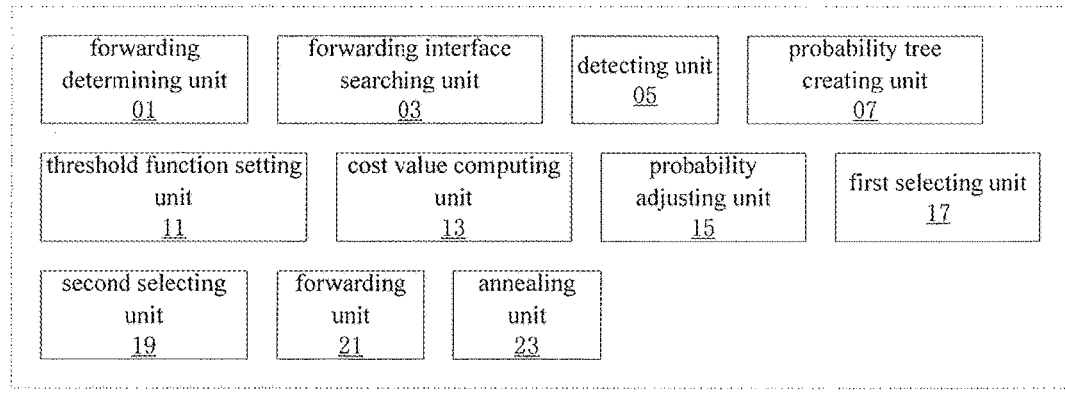
FIG. 5 shows a structural schematic diagram of an apparatus for forwarding an interest packet based on a probability tree in an information network according to an embodiment of the present disclosure.

What has been described above is the method of forwarding an interest packet based on a probability tree in an information network according to the present disclosure. Correspondingly, the present disclosure further provides an apparatus for forwarding an interest packet based on a probability tree in an information network (hereinafter referred to as an interest packet forwarding apparatus). Please refer to FIG. 5, in an embodiment, the interest packet forwarding apparatus may comprise a forwarding determining unit 01, a forwarding interface searching unit 03, a detecting unit 05, a probability tree creating unit 07, a threshold function setting unit 11, a cost value computing unit 13, a probability adjusting unit 15, a first selecting unit 17, a second selecting unit 19, a forwarding unit 21, and an annealing unit 23, which will be explained specially infra.

The forwarding determining unit 01 is configured for determining whether the interest packet received by the network node needs to be forwarded. As mentioned above, if the received interest packet is successfully matched in the CS, the data packet as requested by the interest packet is directly returned; in the case of failing to be matched in the CS but successfully matched later in the PIT, the interface for the interest packet to access will be added to PIT entries; if the received interest packet fails to be matched in the CS and the PIT, the interest packet needs to be forwarded.

The forwarding interface searching unit 03 is configured for: when the received interest packet needs to be forwarded, searching all optional forwarding interfaces corresponding to the interest packet based on a forwarding information base (FIB).

The detecting unit 05 is configured for detecting whether a corresponding probability tree already exists in all optional forwarding interfaces corresponding to the received interest packet; if it is detected that such a corresponding probability tree does not exist, such existence is notified to the threshold function setting unit 11.

The probability tree creating unit 07 is configured for creating a probability tree when the detecting unit 05 detects a non-existence, i.e., detecting that such a corresponding probability tree does not exist, and initializing the probability tree, wherein leaf nodes of the created probability tree correspond one-to-one to all optional forwarding interfaces for the interest packet. The present disclosure does not limit the number of branches of the probability tree, which may be a binary probability tree, a trident probability tree, a quadrantal probability tree, etc. In an embodiment, the number of branches of the probability tree may be set according to actual needs. In a preferred embodiment, the probability tree in the present disclosure is a binary probability tree.

In an embodiment, the forwarding determining unit 01, the forwarding interface searching unit 03, the detecting unit 05, and the probability tree creating unit 07 are optional units in the interest packet forwarding apparatus of the present disclosure.

The threshold function setting unit 11 is configured for: setting a threshold function based on a type of the to-be-forwarded interest packet, the threshold function being for deciding whether to trigger the probability tree where leaf nodes correspond one-to-one to all optional forwarding interfaces for the interest packet to learn. In an embodiment, the set threshold function may be used to adjust a frequency of occurrence of a probability tree learning process, thereby satisfying interest packets of different types.

The cost value computing unit 13 is configured for: after the threshold function triggers the probability tree to learn, computing a cost value of each of the optional forwarding interfaces corresponding to the interest packet, respectively. In one embodiment, the cost value computing unit 03 is configured to compute the cost value of the optional forwarding interface based on a network attribute and a probability value of the optional forwarding interface. The network attribute includes, but not limited to, a round-trip time and an interface status (e.g., rate limitation, etc.) of the forwarding interface; during a specific implementation process, one or more specific network attributes may be selected according to actual needs. The network attributes may be dynamically updated in real time based on network statuses.

The probability adjusting unit 15 is configured for adjusting the probability tree by incrementing probabilities of a leaf node and non-leaf nodes in the probability tree, where the leaf node corresponds to an optional forwarding interface that has a smallest cost value and the non-leaf nodes refer to those nodes that have to be traversed from a root node till the leaf node. The specific adjustment process has been described in step S17 of the interest packet forwarding method of the present disclosure, which will not be detailed here.

The first selecting unit 17 is configured for: based on the adjusted probability tree, starting from the root node of the probability tree, selecting, in accordance with probabilities of respective sub-nodes of a current node, a sub-node of the current node, and stopping till the selected sub-node is a leaf node.

The second selecting unit 19 is configured for: when the threshold function fails to trigger the probability tree to learn, directly starting, based on the probability tree, from the root node of the probability tree, selecting the sub-node of the current node according to the probabilities of the respective sub-nodes of the current node, and stopping till the selected sub-node is a leaf node. In an embodiment, the second selecting unit 19 is an optional unit.

The forwarding unit 21 is configured for forwarding the to-be-forwarded interest packet from the optional forwarding interface corresponding to the selected leaf node.

The annealing unit 23 is configured for causing the probability tree to step out of the current status at a certain probability using a simulated annealing algorithm during a probability tree learning process. The annealing unit 23 is an optional unit, aiming to prevent the probability tree from falling into local optimum. Specifically, when the simulated annealing algorithm is adopted to step out of the existing status, the current status of the probability tree is initialized, and then the probability tree may be subjected to subsequent steps, e.g., checking whether re-learning is needed based on the threshold function, etc.

What has been illustrated above is the interest packet forwarding apparatus of the present disclosure.

According to the interest packet forwarding method and apparatus of the present disclosure, with introduction of the probability tree, the interest packet forwarding process is finally transformed into such a selection process: starting from the root node of the probability tree, selecting a sub-node of the current node in accordance with the probabilities of respective sub-nodes of the current node, and stopping till the selected sub-node is a leaf node; while the introduced probability tree in turn provides a good carrier for machine learning. By regarding the selecting process as an optimization issue, it may be converged to a near optimal state using online machine learning; besides, as the network condition changes, probabilities of the respective nodes in the probability tree may be adjusted. In this way, the forwarding method and apparatus of the present disclosure have a strong adaptability to network changes, i.e., the adaptivity is improved. Compared with the existing interest packet forwarding schemes, the present disclosure improves forwarding efficiency, increases throughput, and achieves load equilibrium.

Now, refer to FIGS. 6-11, which show comparisons between the solution of the present disclosure and traditional forwarding solutions. It may be seen from the figures that the interest packet forwarding solution of the present disclosure is superior to the traditional forwarding solution (e.g. the BestRoute forwarding solution) in aspects of flow finish time, packet drop rate, throughput, load equilibrium and other indexes.

Figure 6:
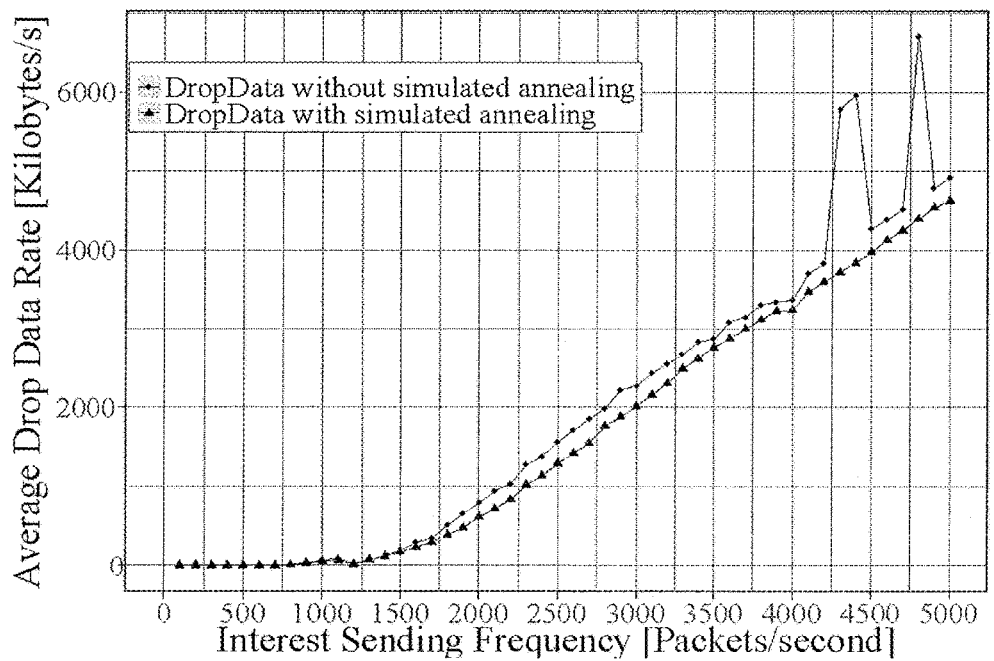
FIG. 6 shows a diagram comparing packet drop rate curves derived from using a simulated annealing algorithm and not using a simulated annealing algorithm when requesting a 4M file at a constant rate based on the forwarding solution of the present disclosure, respectively.

FIG. 6 shows a packet drop rate derived from requesting a 4M file at a constant rate using the solution of the present disclosure at a client, where the triangle solid line represents a drop rate curve when the present disclosure adopts a simulated annealing algorithm solution, and the round-dot solid line represents a packet drop rate curve when the present disclosure does not adopt the simulated annealing algorithm solution. It may be seen from the figure that in the present disclosure, at a constant rate, the solution adopting the simulated annealing algorithm has a lower average packet drop rate than the solution without adopting the simulated annealing algorithm.

Figure 7:
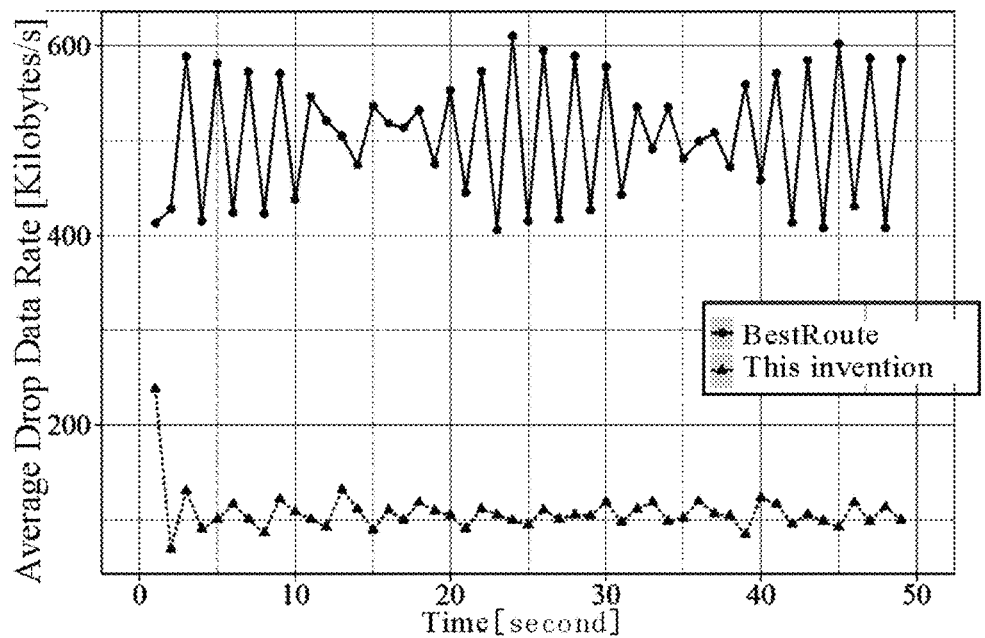
FIG. 7 shows a diagram of comparing packet drop rate curves derived when requesting a 4M file at a fixed frequency of 1500 HZ using a forwarding solution of the present disclosure and using a conventional BestRoute forwarding solution at a client, respectively.

FIG. 7 shows packet drop rate diagrams derived when requesting a 4M file at a 1500 Hz fixed frequency using the solution of the present disclosure and the traditional BestRoute forwarding solution at the client, respectively, wherein the triangular solid line represents a packet drop rate curve when the solution of the present disclosure is adopted, and the round-dot solid line represents a packet drop rate curve adopting the traditional BestRoute forwarding solution. It may be seen from the figure that the average packet drop rate when adopting the solution of the present application is far lower than the average packet drop rate when adopting the traditional BestRoute forwarding solution.

Figure 8:
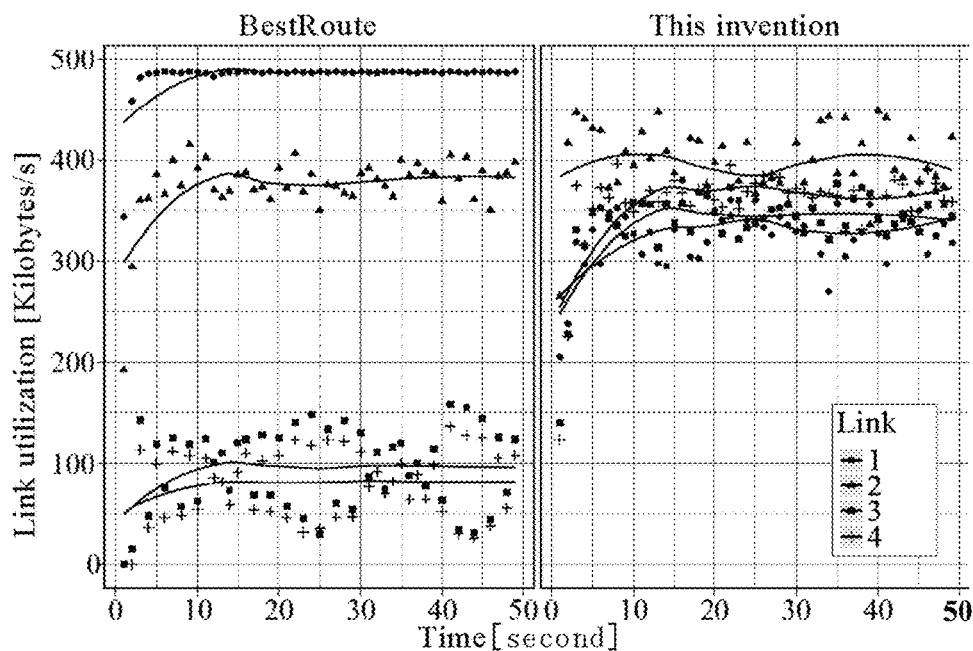
FIG. 8 shows a diagram of comparing traffic distribution curves between different links derived when requesting a 4M file at a fixed frequency of 1500 HZ using a solution of the present disclosure and using a conventional BestRoute forwarding solution at a client, respectively.

FIG. 8 shows traffic distribution conditions of different links derived when requesting a 4M file at a fixed frequency of 1500 HZ using a solution of the present disclosure and using a conventional BestRoute forwarding solution at a client, respectively, wherein the left part in FIG. 8 represents a traffic distribution curve of four links when adopting the traditional BestRoute forwarding solution, and the right part in FIG. 8 represents the traffic distribution curve of the four links when adopting the solution of the present application. It may be seen from the figure that when adopting the traditional BestRoute forwarding solution, the traffic distributions of the four links differ greatly, where the traffic distributions of two links are relatively high, while the traffic distributions of the other two links are relatively low; in contrast, when adopting the forwarding solution of the present application, the traffic distributions of the four links are all relatively high.

Figure 9:
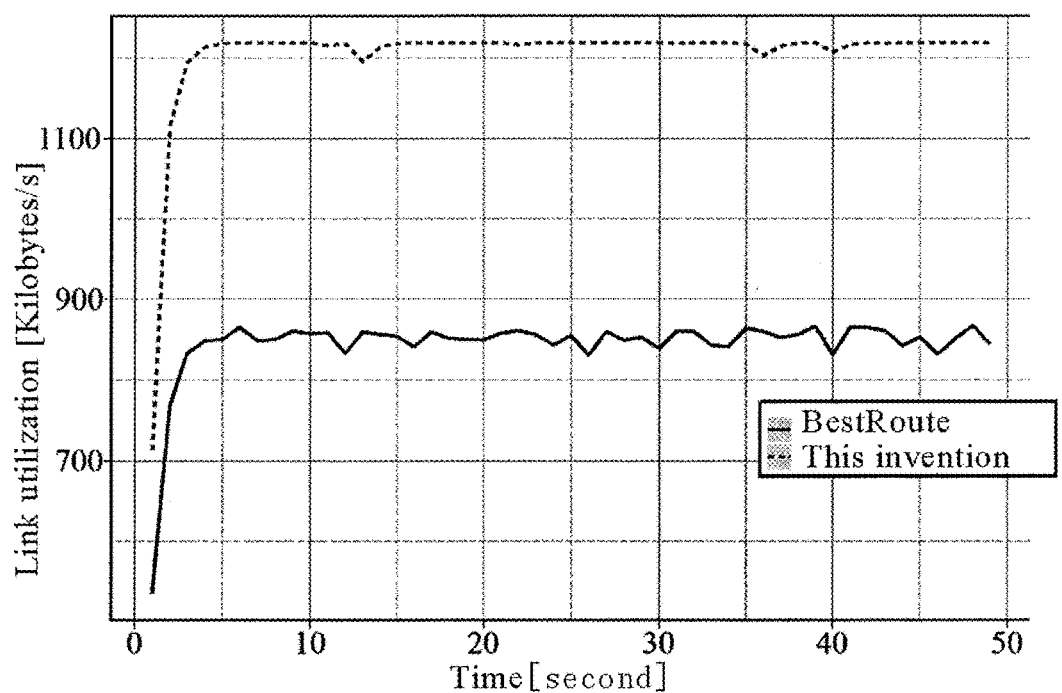
FIG. 9 shows a diagram of comparing throughput curves derived when requesting a 4M file at a fixed frequency of 1500 HZ using a solution of the present disclosure and using a conventional BestRoute forwarding solution at a client, respectively.

FIG. 9 shows throughput diagrams derived when requesting a 4M file at a fixed frequency of 1500 HZ using a solution of the present disclosure and using a conventional BestRoute forwarding solution at a client, respectively, wherein the dotted line represents the throughput curve when adopting the solution of the present application, and the solid line represents the throughput curve when adopting the traditional BestRoute forwarding solution. It may be seen from the figure that the throughput when adopting the solution of the present disclosure is apparently higher than the throughput when adopting the traditional BestRoute forwarding solution.

Figure 10:
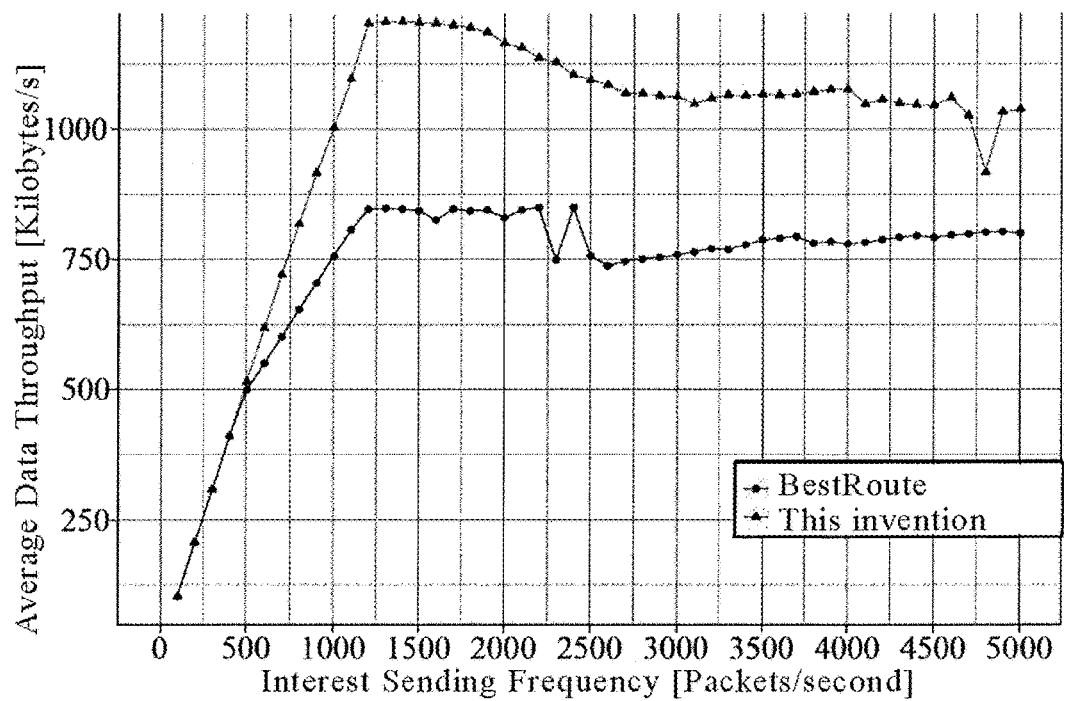
FIG. 10 shows a diagram of comparing throughput curves derived when requesting a 4M file at a constant rate using a solution of the present disclosure and using a conventional BestRoute forwarding solution at a client, respectively.

FIG. 10 shows a throughput diagram derived when requesting a 4M file at a constant rate using a solution of the present disclosure and using a conventional BestRoute forwarding solution at a client, respectively, where the file content requested by the client conforms to a Zipf-Mandelbrot distribution, the triangular solid line in the figure represents the throughput curve when adopting the solution of the present application, and the round-dot solid line represents a throughput curve when adopting the traditional BestRoute forwarding solution. It may be seen from the figure that upon requesting the file at a same constant rate, the throughput when adopting the solution of the present disclosure is apparently higher than the throughput when adopting the traditional BestRoute forwarding solution.

Figure 11:
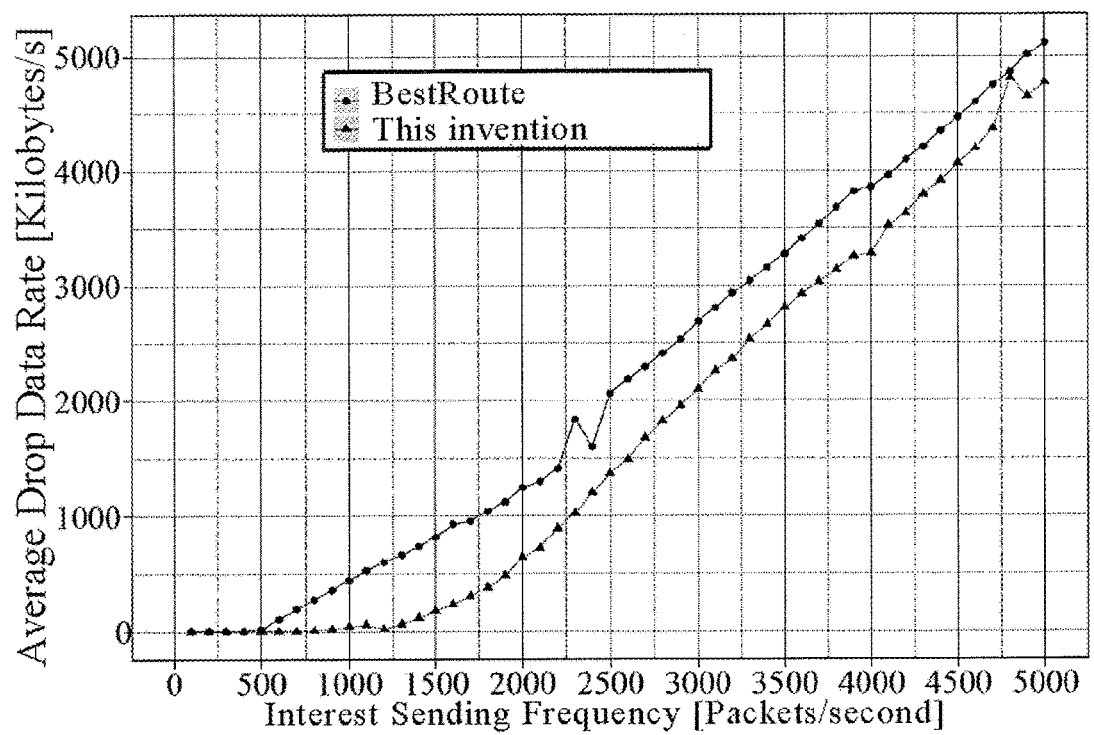
FIG. 11 shows a diagram of comparing network packet drop rate curves derived when requesting a 4M file at a constant rate using a solution of the present disclosure and using a conventional BestRoute forwarding solution at a client, respectively.

FIG. 11 shows a network packet drop rate diagram derived when requesting a 4M file at a constant rate using a solution of the present disclosure and using a conventional BestRoute forwarding solution at a client, respectively, wherein the file content requested by the client conforms to a Zipf-Mandelbrot distribution, the triangular solid line in the figure represents the average packet drop rate curve when adopting the solution of the present disclosure, and the round-dot solid line represents the average packet drop rate curve when adopting the traditional BestRoute forwarding solution. It may be seen from the figure that when requesting the file at a same constant rate, the average packet drop rate when adopting the solution of the present disclosure is significantly lower than the average packet drop rate when adopting the traditional BestRoute forwarding solution.

Specific examples have been applied above to expound the present disclosure. Such examples are only used for facilitating understanding of the present disclosure, rather than for limiting the present disclosure. For a person of normal skill in the art, the specific embodiments above may be varied according to the concept of the present disclosure.

We claim:

1. A method of forwarding an interest packet based on a probability tree in an information network, comprising:
   setting a threshold function according to a type of a to-be-forwarded interest packet, the threshold function being arranged for deciding whether to trigger the probability tree where leaf nodes correspond one-to-one to all optional forwarding interfaces for the interest packet to learn;
   after the threshold function triggers the probability tree to learn, computing a cost value of each of the optional forwarding interfaces for the interest packet, respectively;
   adjusting the probability tree by incrementing probabilities of a leaf node and non-leaf nodes in the probability tree, where the leaf node corresponds to an optional forwarding interface that has a smallest cost value and the non-leaf nodes refer to those nodes that have to be traversed from a root node till the leaf node;
   based on the adjusted probability tree, starting from the root node of the probability tree, selecting, in accordance with probabilities of respective sub-nodes of a current node, a sub-node of the current node, and stopping till the selected sub-node is a leaf node; and
   forwarding the to-be-forwarded interest packet from the optional forwarding interface corresponding to the selected leaf node.

2. The method of forwarding an interest packet based on a probability tree in an information network according to claim 1, further comprising: when the threshold function fails to trigger the probability tree to learn, directly starting, based on the probability tree, from the root node of the probability tree, selecting the sub-node of the current node according to the probabilities of the respective sub-nodes of the current node, and stopping till the selected sub-node is a leaf node.

3. The method of forwarding an interest packet based on a probability tree in an information network according to claim 1, further comprising:
   determining whether a received interest packet needs to be forwarded; when determining a need to forward, searching all optional forwarding interfaces corresponding to the interest packet based on a forwarding information base; and
   detecting whether a corresponding probability tree already exists in all optional forwarding interfaces corresponding to the received interest packet; in the case of non-existence, creating a probability tree and initializing the probability tree, wherein leaf nodes of the created probability tree correspond one-to-one to all optional forwarding interfaces for the interest packet.

4. The method of forwarding an interest packet based on a probability tree in an information network according to claim 1, characterized in that a simulated annealing algorithm is adopted during a probability learning process so as to cause the probability tree to step out of a current status at a certain probability.

5. The method of forwarding an interest packet based on a probability tree in an information network according to claim 1, characterized in that when computing the cost value of each of the optional forwarding interfaces, the cost value of the each of the optional forwarding interfaces is computed based on a network attribute and a probability value of the each of the optional forwarding interfaces.

6. An apparatus for forwarding an interest packet based on a probability tree in an information network, comprising a processor, a memory containing instructions, wherein when the instructions are executed by the processor, the apparatus is configured to:
  set a threshold function according to a type of a to-be-forwarded interest packet, the threshold function being arranged for deciding whether to trigger the probability tree where leaf nodes correspond one-to-one to all optional forwarding interfaces for the interest packet;
  after the threshold function triggers the probability tree to learn, compute a cost value of each of the optional forwarding interfaces for the interest packet, respectively;
  adjust the probability tree by incrementing probabilities of a leaf node and non-leaf nodes in the probability tree, where the leaf node corresponds to an optional forwarding interface that has a smallest cost value and the non-leaf nodes refer to those nodes that have to be traversed from a root node till the leaf node;
  based on the adjusted probability tree, start from the root node of the probability tree, select, in accordance with probabilities of respective sub-nodes of a current node, a sub-node of the current node, and stop till the selected sub-node is a leaf node; and
  forward the to-be-forwarded interest packet from the optional forwarding interface corresponding to the selected leaf node.

7. The apparatus for forwarding an interest packet based on a probability tree in an information network according to claim 6, wherein when the threshold function fails to trigger the probability tree to learn, the apparatus is further configured to directly start, based on the probability tree, from the root node of the probability tree, select the sub-node of the current node according to the probabilities of the respective sub-nodes of the current node, and stop till the selected sub-node is a leaf node.

8. The apparatus for forwarding an interest packet based on a probability tree in an information network according to claim 6, wherein the apparatus is further configured to:
  determine whether a received interest packet needs to be forwarded;
  when the interest packet needs to be forwarded, search all optional forwarding interfaces corresponding to the interest packet based on a forwarding information base; and
  detect whether a corresponding probability tree already exists in all optional forwarding interfaces corresponding to the received interest packet; and
  when a result of the detection is non-existence, create a probability tree and initialize the probability tree, wherein leaf nodes of the created probability tree correspond one-to-one to all optional forwarding interfaces for the interest packet.

9. The apparatus for forwarding an interest packet based on a probability tree in an information network according to claim 6, wherein the apparatus is further configured to adopt a simulated annealing algorithm during a probability learning process so as to cause the probability tree to step out of a current status at a certain probability.

10. The apparatus for forwarding an interest packet based on a probability tree in an information network according to claim 6, wherein the apparatus is configured to compute the cost value of the each of the optional forwarding interfaces based on a network attribute and a probability value of the each of the optional forwarding interfaces.

\* \* \* \* \*